United States Patent [19]

Siclari et al.

[11] 3,856,833

[45] Dec. 24, 1974

[54] METHOD FOR THE PRODUCTION OF ALDEHYDIC ACIDS

[75] Inventors: Francesco Siclari, Barlassina; Pietro Rossi, Paolo, Garlasco, both of Italy

[73] Assignee: Snia Viscosa Societa 'Nazionale Industria Applicazioni Viscosa S.p.A., Milan, Italy

[22] Filed: Feb. 17, 1972

[21] Appl. No.: 227,268

[30] Foreign Application Priority Data

Feb. 19, 1971 Italy.................................. 20802/71

[52] U.S. Cl.............. 260/413, 260/404, 260/526 R, 260/537 P, 260/601 R
[51] Int. Cl............................................. C08h 17/36
[58] Field of Search........................ 260/413, 526 R

[56] References Cited
UNITED STATES PATENTS

| | | | |
|---|---|---|---|
| 2,819,279 | 1/1958 | Brown et al. ....................... | 260/413 |
| 2,891,988 | 6/1959 | Brockman et al. ................. | 260/483 |
| 3,362,971 | 1/1968 | Mitchell............................. | 260/413 |
| 3,383,398 | 5/1968 | Peck et al. ......................... | 260/413 |
| 3,691,233 | 9/1972 | Ellis et al. ......................... | 260/413 X |

OTHER PUBLICATIONS

Houben–Weyl: "Methoden der Organischen Chemie," Vol. VII, part I, Oxygen Compounds II, 1954, pp. 339–344, pp. 339 & 342 & 344 pertinent.

Primary Examiner—Lewis Gotts
Assistant Examiner—Ethel G. Love
Attorney, Agent, or Firm—Shlesinger, Fitzsimmons & Shlesinger

[57] ABSTRACT

A method is disclosed which permits obtaining bifunctional chemical compounds, such as acidic aldehydes from ozonides of olefins, the improvement consisting in that the peroxidic derivatives of the ozonides in question are subjected to transposition in a polar solvent and in the presence of a catalyst. The catalyst is preferably a basic substance such as an alkali metal salt or an alkali metal alcoholate, or also an organic base. The catalytic system may also comprise an organic acid anhydride, provided that it is soluble in the polar solvent aforesaid but cannot react therewith.

11 Claims, No Drawings

METHOD FOR THE PRODUCTION OF ALDEHYDIC ACIDS

This invention relates in general to the preparation of functional compounds and their derivatives, more particularly bifunctional; derivatives, preferably but not exclusively aldehydic acids from which, inter alia, aminoacids can be prepared, which, in turn, as is well known, are the starting materials for the production of polyamides, although the method according to the present invention is not limited to the obtention of such compounds.

According to the prior art, it is known to subject to ozonization both olefins and cyclo-olefins, the formation of ozonides being the result.

The perixode-like products resulting from the fact that ozone can be additioned to carbon-carbon double bonds can be demolished with the concurrent formation of oxygen-containing products, both by reduction with hydrogen and catalysts, and with other reducing agents, aldehyde or ketone function being obtained with more or less high yields, and also by thermal decomposition, the result being the obtention of substances having either aldehydic or ketonic functions, and by-products.

It is also known, and this is a matter of laboratory experiments, that in the ozonolysis mechanism according to the pattern reported above, there are quite different developments when the ozonolysis run is carried out, in a liquid phase, in the presence of reactive, or polar,, solvents, or in the presence of non reactive, or nonpolar, solvents, especially when ozonolysis is carried out by introducing into the liquid phase ozone-laden air, or ozone-laden oxygen, that is, a mixture of oxygen and ozone. Briefly resuming the results of well known laboratory tests, these different developments can be summarized as follows:

By operating in the presence of a reactive solvent, such as an alcohol or a carboxylic acid, it is surmised that the zwitter-ion reacts with the solvent to form a peroxide-like derivative of the type:

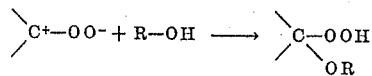

or,

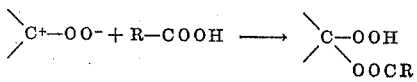

respectively, whereas, by operating in a nonpolar and non reactive environment, peroxides having a polymeric nature are obtained, or peroxides which polymerize as soon as they are formed, in the same environment of the reaction, thus forming dimers or also polymers having a higher degree of condensation.

According to the prior art, the possibility was provided of obtaining, by thermal decomposition of the ozonides, or, better to speak, of the peroxodic derivatives thereof, a mixture of different compounds which contained, from a statistical standpoint, aldehydic acids, polycarboxylic acids (bicarboxylic acids, in practice) and polyaldehydes (in practice, dialdehydes). For example, according to said procedure, said derivatives can be thermally decomposed in polar solvents at temperatures which generally exceed 70°C and which usually are 100°–110°C. Apart from the fact that, obviously, a lower yield of the desired compound is obtained (i.e., the aldehydic acid), in practice, the resulting compounds are, in turns, compounds having an inadequate purity and homogeneousness, and comprise a considerable amount of by-products, and, at any rate, the process, which proceeds under virtually uncontrollable, often explosive, conditions, is not adapted, as is well known, to be commercially usable in a concrete manner, inasmuch as it is not conducive to a single product with a high yield.

Having these considerations in mind, it is an object of the present invention to provide a method for the production of functional compounds, more particularly bifunctional compounds, preferably but not exclusively aldehydic acids from the ozonides which can be obtained from the corresponding olefins, more particularly cyclo-olefins, these derivatives being preferably in a highly pure form.

It is an additional object of the invention to provide a method as outlined above which comprises an ozonide transposition selective treatment, with high and very high yields of the expected compound, such as an acidic aldehyde.

To the end of the invention, the starting product is a solution of ozonides in a polar solvent. This solution is of a reactive type, that is, the ozonide reacts with the polar solvent to form a peroxide derivative of the kind referred to above.

If the ozonide has been produced by ozonization of an olefin in a polar solvent, or in a phase which contains a polar solvent, the ozonization gives said peroxide derivative directly.

The transposition which is carried out by operating according to the invention can be summarized, as a whole, as follows:

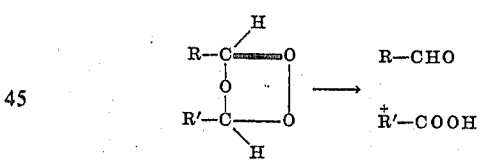

As can be seen, functional compounds are obtained and, if R and R' form a part of a ring structure, for example if cyclo-olefins are the starting material, for transposition produces an acidic aldehyde according to the following pattern:

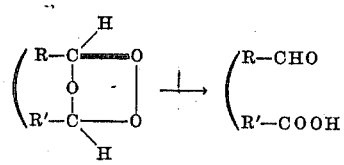

Inasmuch as the ozonide is actually present in the form of a peroxide derivative, the transposition will involve a sequence of passes which have not been exactly detected and for which reason no attempt will be made to define them.

According to the invention, said transposition is obtained, in solution in a polar solvent, and preferably at a low temperature, more particularly not above 70°C and preferably in the order of 20°C but not necessarily below 10°C, in the presence of a catalyst system comprising at least a basic compound which is substantially soluble in said polar solvent, and which can be a salt or an alcoholate of an alkali metal, or an organic base, and preferably comprising also an anhydride of an organic acid, soluble in said solvent but not reactive therewith, an unpredictable favorable catalytic action having been ascertained, which is the result of the matching of said anhydride with said basic compounds.

The polar solvents which have proven to be most advantageous for obtaining the solution to be subjected to transposition are the low molecular weight alcohols, such as methanol, ethanol, etc., and carboxylic acids, such as formic, acetic, propionic and other acids, as used individually or in admixture with each other or with other polar solvents, the use of other appropriate polar solvents being not excluded.

Preferably, the alkali metal salts of an aliphatic organic acid, such as sodium acetate, are used as the alkali metal salt, as well as potassium acetate, sodium formate, or potassium formate or lithium formate, sodium or potassium propionate, sodium or potassium stearate, etc., and also the alkali metal salts of an aromatic acid.

As the alcoholate, sodium or potassium methylate, sodium or potassium ethylate or other known alcoholates can be used as the alcoholate.

As the organic base, amines are preferably used, such as tertiary amines, for example trimethylamine, triethylamine, etc., or a cyclical nitrogen compound, for example pyridine, quinoline and the like, or also quaternary ammonium derivatives.

As the anhydride, for example, acetic or propionic anhydride can be used, and more particularly an anhydride corresponding to the polar solvent which can be used for the formation of the starting solution which contains the ozonide in the form of its peroxide derivative.

According to a characteristic aspect of the invention, the carboxylic acid anhydride can be added to the starting solution which contains the ozonide in the form of its peroxide-like derivative, in the polar solvent. According to another aspect, the starting solution, coming from a preceding ozonization stage, already contains such an anhydride, inasmuch as the latter has been added during said ozonization stage and then in such a case, no further addition of anhydride to the solution to be subjected to the characteristic transposition of this invention is required.

The basic compound referred to above, which displays its favorable catalytic action during the characteristic transposition treatment, must be added when making up the starting solution to be subjected to transposition, rather than during the preceding stages, such as ozonization, since, in that case, during ozonization, a transposition of the ozonide could take place, at least in part, but, under such conditions also other products different from the expected one could be formed and thus the solution obtained to be subjected to the subsequent transposition would not contain the ozonide derivative in the desired purity, and would not be adapted to undergo transposition with satisfactory results.

Advantageously, the transposition of the ozonides or of functional compounds, preferably acidic aldehydes, can be carried out as a continuous run by feeding a plural-stage reactor, by appropriate metering apparatus or even pumps, with the solution of the ozonide derivative in the polar solvent and the solution of the alkali metal salt (or the organic base), and by continually removing the solution of the acidic aldehyde. The reaction solvents are preferably evaporated in a liquid film vacuum apparatus or as a batch in a vacuo. The heat evolved during the transposition is withdrawn by circulating water which is thermostatically controlled at the desired temperature, generally 20° to 30°C. The transposition apparatus is kept under an inert gas blanket, preferably carbon dioxide to prevent the oxidization of the acidic aldehyde to a carboxylic acid.

The following nonlimiting examples are intended to illustrate more detailedly the features of the invention.

An ozonization method is described at the outset, which corresponds to what has been described in a copending application of even date by the same applicants, said process permitting obtaining a solution of an ozonide — in the case in point the cyclo dodecene ozonide—having a high purity, which is particularly adapted to carry this invention into practice.

An apparatus has been used, which was equipped with a reactor having a volume of 800 mls. (effective) which was maintained at an internal temperature of about 9°C. The reactor was initially charged with 73 grs. of cyclododecene (96 percent purity) in a mixture composed of 557 grs. of cyclohexane and 70 grs. glacial acetic acid (ratio of polar to nonpolar solvent 1 to 8 approx.). The reactor has been initially fed with ozone-containing oxygen, at the rate of flow of 60 liters an hour of the mixture $O_2 + O_3$, the rate of flow of the ozone being 3.8 grams an hour. The rate of flow has been kept constant.

After about 5 minutes, it was observed that the solution became turbid and that a heavy phase began to precipitate dropwise towards the reactor bottom; said phase consisting of an ozonide, prevailingly dissolved in the polar solvent (acetic acid), with which it appears to have reacted and thus being in a form, or state, which can be not quite improperly defined as an "acetylated ozonide."

Obviously, the formation of the heavy phase involves a removal of acetic acid and cyclododecene from the ozonization environment, this term being intended to identify the portion of the reactor's inner space which is above the level of the means used for indroducing the ozone-laden gaseous phase, that is, the portion through which said gas stream is caused to flow and in which the olefin can be contacted by the ozone. To allow for this removal and maintain the initial ratio of the reactants substantially constant, the necessary amounts of the reactants must be fed to the reactor. By trial and error the rate of flow which is required to ensure such a compensation is found out, and it was 35 grs. an hour of acetic acid, and 17.35 grams an hour for cyclododecene.

Obviously, also the nonpolar solvent (cyclohexane) is physically present in small values in the heavy phase aforementioned, even though it plays no role in the reaction, and can thus be removed along with the heavy phase. Thus, periodically and continously, the level of the liquid mass is brought back, or maintained, to its initial value, by additions of cyclohexane.

Once an adequate amount, or "head" of heavy phase has been built up on the reactor bottom (after about one hour as from the start of the operations) the phase is withdrawn continuously in an amount which is sufficient to maintain said "head." By virtue o the introduction of the ozone-laden oxygen and the resistance opposed to the discharge of the reaction gases, the pressure within the reactor was stabilized around values in the order of 860 mms. of mercury (abs. pressure).

In appropriate traps, kept at minus 70°C, collect all the substances entrained in a gaseous state with the outgoing oxygen, and these are predominantly cyclohexane. In a check-up treatment with a 5 percent solution of potassium iodide, the presence of negligible quantities of unreacted ozone in the exhaust gas was ascertained. After 15 hours of continuous run, the quantities of the fed-in compounds and of the heavy phase withdrawn from the reactor were checked, the following values having been measured:

| | |
|---|---|
| Fed-in cyclododecene | 260 grams |
| Fed-in ozone | 56.88 grams |
| Fed-in acetic acid | 524 grams |

The heavy phase, that is, the acetic solution of acetylated ozonide (containing small values of unreacted cyclododecene and cyclohexane), was, in turn, 898.3 grams. Such a heavy phase was treated with cyclohexane in order to strip it from the small amount of cyclododecene included therein (2 percent), then concentratedd in a vacuo (20 mms. Hz), so that 528 grams of concentrated ozonide were finally obtained. Titration of active oxygen was performed according to the known G. Lohaus' method, and the value of 3.44 percent was obtained.

By conventionally calculating the reaction yields one obtains, on the basis of the fed-in active oxygen, in terms of ozone:

$(56.88 \times 33.3)/100 = 18.9$ grams with respect to the active oxygen as contained in the ozonide $(528 \times 3.44)/100 = 18.2$ grams so that the yield, with respect to ozone, was $(18.2/18.9) \times 100 = 96.4\%$ By conventional analytical methods, the regularity and the structural identity of the acetylated ozonide as obtained were checked, as a function of its ability to be converted into products of a high purity, as follows.

16.20 grams of an acetic solution of the ozonide (46 percent) were added to a suspension of zinc dust, in a mixture of acetic acid, alcohol and water, at minus 5°C. Upon heating to 30°C during 1 hour, evaporation and extraction with ether, one obtains 6.85 grams of dodecanedial-1:12 having a 98.3 percent purity, as checked on the contents of aldehyde functions, with a boiling point of 125°–127°C under 2 mms. of mercury, and disemicarbazone at 201°C, that is very close to the value (202°C) as reported by the specialized technical literature.

A second sample of the solution (14.55 grs.), treated with zinc dust as above, was neutralized with alcoholic NaOH, at minus 5°C, and further reduced (NaBH$_4$) to dodecanediol-1:12. Upon acidification with HCl, extraction with ether and evaporation of the solvent, there were obtained 6.34 grs. of dodecanediol-1:12, whose identity and purity were shown by the melting point, found as 79.5°–80°C, that is very close to the value (79°–79.5°C) as shown by the technical literature for this compound.

A further check of the composition and purity of the products which can be obtained, by reduction, from the thusly obtained ozonide was made by treating a portion of dodecanediol-1:12, as obtained above with diazomethane, so as to esterify the possibly present organic acids and then carrying out a gaschromatographic analysis. It was ascertained that the compound had a purity of 98.7 percent, the impurities (1.3 percent) consisting of 12-hydroxydodecanoic acid.

The acetic solution of ozonide, that is, the solution of acetylated ozonide, obtained as described above, or otherwise, is then treated, according to the invention, as follows:

EXAMPLE I

Transposition of the ozonide of cyclododecene to 12-oxododecanoic acid and subsequent treatments.

450 grams of the acetylated ozonide of cyclododecene, in a concentrated acetic acid solution (46 percent), preferably obtained according to Example 1 of the above mentioned copending application, have been placed in a heat-resistant glass reactor, equipped with a jacket and having a bottom outlet. There are added 396 grs. of 94.6 percent acetic anhydride. The reactor is brought to 20°C and air is scavenged out by a CO$_2$ stream and there are added, during 20 minutes, 79.5grs (0.1 mol of CH$_3$COONa per mol of charged ozonide) of a 10 percent sodium acetate solution in glacial acetic acid, while maintaining the temperature to 20°C by removal of the reaction heat with circulation of water in the reactor jacket.

Upon consecutive samplings through the reactor's bottom outlet, the variation of the contents of active oxygen versus the time had been measured in order to get interesting information as to the mechanism, the development and the regularity of the reaction. It has thus been established that the reaction velocity is a function of the acetic anhydride concentration.

The measured values are reported in the Table.

| Time mins. | Active Oxygen % | Time mins. | Active Oxygen % |
|---|---|---|---|
| 0 | 1.61 | 180 | 0.288 |
| 30 | 1.56 | 210 | 0.200 |
| 60 | 0.99 | 240 | 0.127 |
| 90 | 0.72 | 270 | 0.064 |
| 120 | 0.52 | 300 | 0.035 |
| 150 | 0.39 | | |

After a 5-hour reaction (decrease of active oxygen by 98 percent) the reaction solvent was removed in a vacuo at the maximum temperature of 50°C, under an inert gas stream (N$_2$). The residue (227 grs.) was suspended in 250 mls. of degassed distilled water, and brought to a boil during 30 mins. in an inert gas environment (N$_2$).

Upon cooling, the precipitate is collected on a filter in a vacuo and washed with distilled water, then dried in a vacuo at the maximum temperature of 40°C.

There are thus obtained 190 grs. of a product having a melting point of 65°–68°C, with an acidimetric titer of 4.63 m.eq./gram and an aldehyde titer (NH$_2$OH) of 4.7 m.eq./gram (This titer, both aldehydic and acidic, is, in theory, 4.67 m.eq./gram for 12-oxododecanoic acid).

A sample of this product, as reduced with $NaBH_4$, had a melting point of 81°–83°C, which is very close to the one indicated by the literature (84°C) for the 12-oxohydroxy dodecanoic acid.

From another sample of the same product the relevant oxime was obtained (upon purification of the acidic aldehyde by crystallization as the sodium salt) and the melting point was 112°C (literature: 111°C).

The gaschromatographic analysis of another sample (reduced with a $NaBH_4$ and esterified with diazomethane) indicated the following composition on an acidic aldehyde basic:

| | |
|---|---|
| Dodecanedioic-1,12 acid | 0.2% |
| 12-oxododecanoic acid | 94.7% |
| Dodecanedial-1,12 | 3.1% |
| Others | 2.0% |

The reaction of the acetylated ozonide, a reaction which, on the basis of the foregoing is a transposition proper, gives very high yields both qualitatively (as shown by the above described tests) and quantitatively. As a matter of fact, the yield, calculated with respect to the polyfunctional compound obtained, is:

$(450 \times 46)/(100 \times 214) = 0.967$ mols of cyclododecene ozonide $(190/214) = 0.888$ mols of acidic aldehyde $(0.888/0.967) = 91.8\%$ total yield On account of the industrial importance of the subject method to the end of the preparation of aminoacids, the product as obtained by the above described transposition procedure, has been susequently subjected to a reducive amination process.

Reductive amination of the 12-oxododecanoic acid 50 grams of 12-oxododecanoic acid, obtained as suggested above, have been slurried in 100 mls. of degassed water and there are added to the slurry, under an inert gas ($N_2$) blanket, 240 mls. of a 5 percent solution of sodium carbonate. Heating has been effected to 55°C until a complete dissolution has been obtained. This solution was placed in an autoclave and 70 grams of ammonia, with 12 grs. of Nickel-Raney have been added thereto with a vigorous stirring. The autoclave has then been pressurized at 30 atmospheres with hydrogen and the temperature has been brought to 60°C after 1 hour, the pressure has been raised to 80 atmospheres whereafter the temperature was raised once again until reaching 80°C and maintained during 4 additional hours.

The reaction mass, upon cooling, was filtered to remove the catalyst and evaporated in a vacuo until the solvents had been completely removed. The residue was redissolved in water, filtered again in hot conditions to remove the insolubles, its pH was adjusted to pH 6.5, and finally recrystallized by cooling.

A white crystalline precipitate was obtained which has been separated from its mother liquors by filtration, washed with a small amount of water, and recrystallized from a mixture of water and normal propyl alcohol. There was obtained 43.4 grs. of 12-aminododecanoic acid, having a melting point of 182°–183°C (literature :183°C), also in admixture with a sample product, the latter being obtained with the conventional techniques. The yield was 91.5percent. The product was prefectly adapted to the production of polyamides.

EXAMPLE II

Transposition of the cyclohexane ozonide to 6-oxohexanoic acid 300 grams of an acetic solution of the cyclohexane ozonide, (31.4 percent concentration) were treated as described in Example I above, by adding 296 grs. of acetic anhydride thereto. Upon heating according to sequence of operations and in the times as suggested in the preceding Example. 59.2 grams of a 10 percent solution of sodium acetate in acetic acid were added thereto. The reaction temperature was maintained at 20°C by external cooling.

After 6 hours, the decreased of the active oxygen was 96 percent. The solution was evaporated in a vacuo, under an inert gas stream and the residue (93 grams) was dissolved in ether. The etheral solution was twice washed with 10 mls. water whereafter the ether was evaporated. The residue, added to 100 mls. water, was heated during 10 minutes to 100°C, under a nitrogen stream, the aqueous solution thus obtained was stripped from water by evaporation in a vacuo. The residue, as reduced to 87 grams, was distilled in an apparatus of the molecular distillation kind. The distillate, 85 grs., had a boiling point of 145°C under an abs. pressure of 8 mms. of mercury (literature: 144°C). The analysis gave the following results:

| | |
|---|---|
| Molecular weight | 129 (theory:130) |
| Aldehydic groups for $CHO (CH_2)_4 COOH$ | 7.58 m.eq./gram (theory:7.68 m.eq./gram) |
| Acidic groups (as above) | 7.7 m.eq./gram (theory:as above) |
| Yield | 90.4% as acidic aldehyde with respect to the charged acetylated ozonide. |

EXAMPLE III

Transposition of the cyclo-octene ozonide to 8-oxooctanoic acid 500 grams of the acetic solution of the cyclo-octene ozonide (conc. 40.6 percent, corresp. to 4.13 percent active oxygen), were treated and caused to react, as described in Example I, by adding thereto, under a carbon dioxide stream, 380 grams of acetic anhydride, during 20 minutes, and then 126 grams of a 10 percent solution of potassium acetate in acetic acid, the temperatue being kept at 15°C during the first hour of the reaction. The temperature was then brought to 20°C and maintained as such during 2 hours, whereafter the temperature is brought to 30°C during 2 additional hours.

After that time, the decrease of the active oxygen was 98 percent. The solution, evaporated in a vacuo under an inert gas stream, gave a residue of 220.6 grams, which was boiled during 10 minutes in 250 mls. of water, still under an inert gas blanket, then allowed to cool and extracted with ether. Upon removal of the ether, by evaporation, a dry residue was obtained, weighing 198.5 grams, which was distilled as in the preceding Example, and 185 grams of a distillate were obtained, which was virtually pure 8-oxo-octanoic acid. The analysis gave the following results:

| | |
|---|---|
| 2,4-binitrophenylhydrazone | : melting point 166°C (literature: 164°C–166°C) |
| molecular weight | : 156 (theory: 158) |
| Aldehydic groups (calcd. for $CHO(CH_2)_4COOH$) | : 6.28 m.equiv./gram (theory: 6.32 m.equiv./gram) |
| Acidic groups (as above) | : 6.45 m.equiv./gram (theory: as above) |
| Yield | : 91% of acidic aldehyde with respect to the charged ozonide. |

EXAMPLE IV

Transposition of the cyclohexene ozonide to 6-oxohexanoic acid 85 grams of a solution (in ethanol) of the cyclohexene ozonide (conc. 71.5 percent, corresp. to 8.8 percent active oxygen), were treated as described in Examples I to III by adding thereto, under a nitrogen steam, 160 grs. of acetic anhydride. Upon cooling the solution to minus 10°C, there were added, during 30 minutes, 30 mls. of a 7 percent solution of sodium ethylate in ethanol. After 6 hours, at minus 10°C, the decrease of active oxygen was 92 percent. Such a solution was evaporated in a vacuo to dryness and treated according to the preceding Examples. There were obtained 51.8 grams of 6-oxo-hexanoic acid, with a yield of 85.5 percent with respect to the charged ozonide.

EXAMPLE V 50 grs. of an acetic solution of cyclododecene ozonide, containing 12.6 grs. of ozonide are supplemented, under nitrogen, with 25.26 grs. of acetic anhydride and 0.65 grs. of pyridine dissolved in 9.35 grs. glacial acetic acid. The temperature is maintained at 22°C during 190 mins., then at 40°C during 85 additional minutes. The active oxygen decrease of the contents as a function of the elapsed time has the following trend:

| Time mins. | Temperature °C | Active oxygen contents % |
| --- | --- | --- |
| 0 | 22 | 100% |
| 85 | 22 | 36.1 |
| 190 | 22 | 24.0 |
| 195 | 40 | — |
| 275 | 40 | 10.7 |

The product is stripped of the solvent in a vacuo and under a nitrogen blanket at a maximum temperature of 55°C. The residue is dissolved in 55 mls. dioxane-$H_2O$ (80-20), refluxed during 40 mins. and then dried in a vacuo. The residue (15 grs.) is distilled in a vacuo again. There are obtained 12.6 grs. of a distillate (boiling point 196°–198°C under 1 mmHg) and 1.85 grs. of a residue. The distillate, which solidifies upon cooling, has a melting point of 64°–68°C and an aldehyde titer of 4.69 milliequivalents per gram and an acidic titer of 4.55 milliequivalents per gram. Thin layer chromatography (Silicagel G plates, eluant benzene dioxane and formic acid, detector phosphomolybdic acid) indicates that the distilled product is composed, almost in its entirety, by 12-oxododecanoic acid with a small amount of dodecandial-1:12.

By operating as in the example described and varying the nature of the basic catalyst in some cases, the following results have been obtained:

| Olefin (solvent) | Temp. °C | Catalysts | Product | Yields % |
| --- | --- | --- | --- | --- |
| cyclododecene (acetic acid) | 40 | triethylamine | 12-oxo-dodecanoic acid | 86.5 |
| cyclohexene (acetic acid) | 20–40 | pyridine | 6-oxo-hexanoic acid | 84.3 |
| cyclododecene | 50 | quinoline | 12-oxo-dodecanoic acid | 67 |

EXAMPLES FROM VI TO X

To complete the showing of the possibility of obtaining polyfunctional compounds by transposition processes as described above, there are resumed, in the following Table, a few additional results of these processes. This Table indicates the olefins which have been used to obtain the corresponding ozonides, which have been subjected, in turn, to transposition, as well as the relative polar solvents, the temperature of the transposition process, the catalyst system, the product obtained thereby, and the respective yields.

| Ex. No. | Olefin (solvent) | Temp. °C | Catalyst | Product | Yield % |
| --- | --- | --- | --- | --- | --- |
| VI | cyclododecene (ethanol) | 6 | sodium acetate propionic anhydr. | 12-oxo-dodecanoic acid | 91.4 |
| VII | cyclododecene (methanol) | 0 | lithium acetate acetic anhydride | 12-oxo-dodecanoic acid | 84.4 |
| VIII | cyclododecene (propionic acid) | 5 | sodium acetate propionic anhydride | 12-oxo-dodecanoic acid | 88.6 |
| IX | cyclo-octene (ethanol) | 30 | sodium acetate acetic anhydride | 8-oxo-octanoic acid | 91.1 |
| X | cyclo-octene (methanol) | 40 | sodium acetate acetic anhydride | 8-oxo-octanoic acid | 87.6 |

As can be seen, the present invention has been described and exemplified with particular emphasis on ozonization and subsequent treatments of cycloaliphatic olefin ozonides, on account of the particular importance of such olefins and the derivatives obtainable therefrom according to the novel method of the invention. However, it is apparent that such a method is not limited to said olefins, a substantial advantage having been confirmed also in the case of treatments of ozonides obtainable from acyclic olefins.

It is possible to transpose to bifunctional compounds, in the manner described above, also ozonides of cycloolefins having more than one unsaturation, for example to unsaturated aldehydic acids. For example, from the ozonide of 1:5:9-cyclododecatriene there can be obtained, upon transposition in the manner described above, 12-oxododecadiene carboxylic acid. This compound, subjected to reductive amination as in the example reported above, gives the saturated omega amino acid.

Also open chain ozonides can be transposed to obtain the corresponding acids having the formula —$CH_2$—COOH as well as the respective aldehydes having the formula —$CH_2$—CHO.

It should also be noticed that while preferably the treated ozonides are obtained directly in the form of their peroxidic derivatives as formed in their reactive solution in polar solvents by ozonization according to the method described in the above mentioned copending application, the method can be applied to ozonides and their peroxidic derivatives irrespective of the manner in which they may have been obtained.

Likewise, the examples have been limited, for the sake of simplicity, to ozonization and treatment of olefins having from 6 to 12 carbon atoms, such conditions being not, as themselves, a limitation of the invention, the same being true of the term "polyfunctional" which has been purposely adopted to the end of not limiting the invention to the exemplified field of the obtention of bifunctional compounds.

Finally, the specific procedures as described above should not be construed, in turn, as limitations, inasmuch as a number of modifications and changes can be introduced by anyone skilled in the art without departing from the scope of the present application, more particularly as defined in any one or more of the appended claims.

What is claimed is:

1. A method for the production of high yields of an acidic aldehyde comprising subjecting the peroxide derivative of the ozonide of a cyclo-olefin to transposition in a polar solvent selected from the group consisting of lower alkanols and carboxylic acids by adding to the starting solution consisting of said derivative in said solvent a catalytic system which is soluble in said solvent and comprises an anhydride of an organic acid, non-reactive with carboxylic acid and a basic substance selected from the group consisting of alkali metal salts, alcoholates of an alkali metal, and organic bases.

2. The method of claim 1, wherein the basic substance is a salt of an alkali metal.

3. A method according to claim 2, wherein the alkali metal salt is a salt of an aliphatic organic acid, selected from the group consisting of sodium acetate, potassium acetate, sodium formate, potassium formate, lithium formate, sodium propionate, potassium propionate, sodium stearate, potassium stearate, and an alkali metal salt of an aromatic acid.

4. A method according to claim 3, wherein the basic substance is an amine selected from the group consisting of trimethylamine, triethylamine and quaternary ammonium derivatives.

5. A method according to claim 1, wherein the basic substance is a cyclic nitrogenous base selected from the group consisting of pyridine and quinoline.

6. The method of claim 1, wherein the polar solvent is a carboxylic acid, and the anhydride of the organic acid is the anhydride of said carboxylic acid.

7. The method of claim 1, wherein the transposition is carried out at a temperature between 10° and 70°C.

8. A method according to claim 7, wherein the transposition is carried out at a constant temperature.

9. A method according to claim 7, wherein the transposition is carried out at an ever increasing temperature.

10. A method according to claim 2, wherein the ozonide is prepared for the transposition process in a mixture comprising the solution of the ozonide derivative in said polar solvent and said anhydride of the organic acid, said process being primed by the addition of the salt of an alkali metal.

11. A method according to claim 1, wherein the polar solvent is selected from the group consisting of low molecular weight alcohols, and carboxylic acids.

* * * * *